(No Model.)
B. S. HASKELL.
Tire Upsetter.
No. 243,555. Patented June 28, 1881.
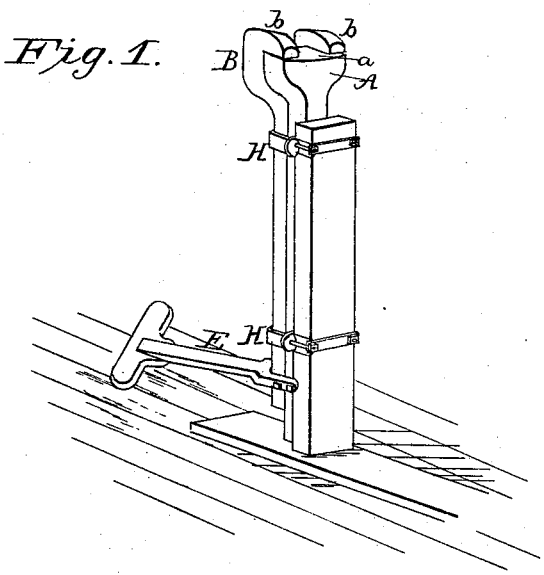

UNITED STATES PATENT OFFICE.

BENJAMIN S. HASKELL, OF CUMBERLAND, RHODE ISLAND, ASSIGNOR TO THE WILEY & RUSSELL MANUFACTURING COMPANY, OF DEERFIELD, MASSACHUSETTS.

TIRE-UPSETTER.

SPECIFICATION forming part of Letters Patent No. 243,555, dated June 28, 1881.

Application filed March 17, 1881. (No model.)

*To all whom it may concern:*

Be it known that I, BENJAMIN S. HASKELL, a citizen of the United States, residing at Cumberland, in the county of Providence and State of Rhode Island, have invented Improvements in Tire-Upsetters.

The following description, taken in connection with the accompanying plate of drawings hereinafter referred to, forms a full and exact specification, wherein are set forth the nature and principles of the invention by which the same may be distinguished from others of a similar class, together with such parts thereof as are claimed as new and are desired to be secured by Letters Patent of the United States.

My invention relates to that class of tire-upsetters in which a clamping mechanism is combined with an anvil or plate upon which the tire may be hammered; and the object thereof is to furnish a compact and portable mechanism, convenient and effective in use and simple in construction, which may be manufactured at a much less cost than the machines now in use.

To this end my invention consists, primarily, in combining with an upright anvil of peculiar construction, the top of which is made concave for the reception of the part of the tire to be upset, an upright clamping device provided with a slot for the reception of a vertical spiral spring.

It also consists in certain novel combinations of parts, which will be hereinafter described.

In the accompanying plate of drawings, in which corresponding parts are designated by the same letters, Figure 1 illustrates, in perspective, my improved tire-upsetter. Fig. 2 is the clamping-bar. Fig. 3 designates the upright anvil. Fig. 4 is the treadle.

The top part of the upright anvil A is spread just enough to form a curvilinear face, *a*, for imparting a proper shape to the part of the tire to be upset, and to receive the jaws or clamping-arms *b* of the upright sliding bar B. The said bar B is provided with a longitudinal slot, C, for the reception of a spiral spring, D, attached to the anvil-standard, and is actuated by the lever E, which is pivoted to the bar B and hinged to the standard A. As the spring is arranged in a slot or chamber, it is protected from accident and out of the way of the workmen.

Collars H or other suitable devices may be provided for the purpose of guiding and holding in position the upright bar B, and the spiral spring should be of such size and tension as to permit the jaws to rise a short distance above the anvil, in order to afford room for the introduction of the tire.

The operation of the machine is exceedingly simple and effective. The part of the tire to be upset, having been treated to the required degree, is bent inward in such a manner as to form a curve of sufficient size to shorten the tire to its proper diameter and introduced between the curvilinear surface of the anvil and the projecting arms or jaws of the clamping mechanism, so that the bend in the tire occupies a position between the jaws *b*. The tire is then clamped firmly in its place upon the anvil and between the jaws by means of the lever E, and the bend is hammered out upon the anvil until the tire is sufficiently shortened.

If thought desirable, the portion of the anvil upon which the tire is clamped may be provided with inwardly-projecting teeth, to prevent the tire from slipping while under the action of the hammer; or the parts of the jaws coming in contact with the tire may be roughened or serrated for the same purpose.

I am aware that tire-upsetters have been heretofore combined with anvils or plates upon which the tire may be hammered; but such machines have been generally expensive in construction and of such size and shape as to render them inconvenient in use and operation.

Having thus described my invention, I claim and desire to secure by Letters Patent of the United States—

The combination of the upright standard A, the upright sliding bar B, having projecting arms or jaws *b*, the spring D, arranged within the slot C, the lever E, and the collars H, all operating together, as and for the purposes described.

In testimony that I claim the foregoing I have hereunto set my hand and seal this 8th day of March, 1881.

BENJAMIN STEWARD HASKELL. [L. S.]

Witnesses:
ELLIS L. BLAKE,
GEORGE O. COOK.